United States Patent [19]
Winsel

[11] 4,180,624
[45] Dec. 25, 1979

[54] STORAGE BATTERY WITH AQUEOUS ELECTROLYTE AND RECOMBINER

[75] Inventor: August Winsel, Kelkheim, Fed. Rep. of Germany

[73] Assignee: Varta Batterie Aktiengesellschaft, Hanover, Fed. Rep. of Germany

[21] Appl. No.: 6,098

[22] Filed: Jan. 24, 1979

[30] Foreign Application Priority Data

Feb. 3, 1978 [DE] Fed. Rep. of Germany ...... 2804583

[51] Int. Cl.² .............................................. H01M 2/12
[52] U.S. Cl. ........................................ 429/54; 429/57; 429/89
[58] Field of Search ...................... 429/54, 53, 55, 57, 429/82, 89

[56] References Cited
U.S. PATENT DOCUMENTS

| | | | |
|---|---|---|---|
| 3,201,284 | 8/1965 | Ellis | 429/55 |
| 4,002,496 | 1/1977 | Nitta | 429/53 |
| 4,052,534 | 10/1977 | Devitt | 429/54 X |

*Primary Examiner*—Charles F. LeFevour
*Attorney, Agent, or Firm*—Weiser, Stapler & Spivak

[57] ABSTRACT

Bi-directional valve means are provided between the interior and the ambient, opening outward at a predetermined internal overpressure, and inward at a predetermined underpressure.

6 Claims, 4 Drawing Figures

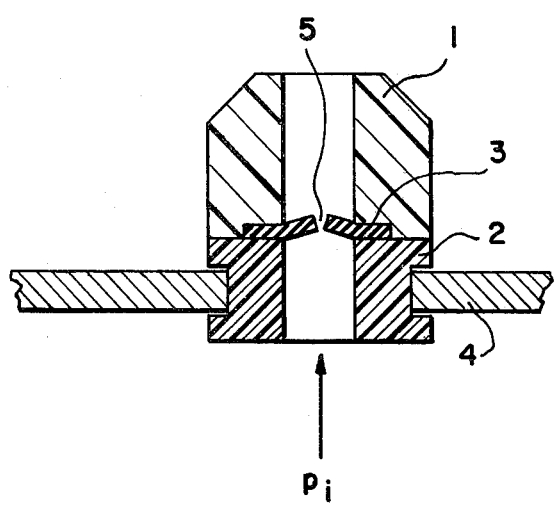
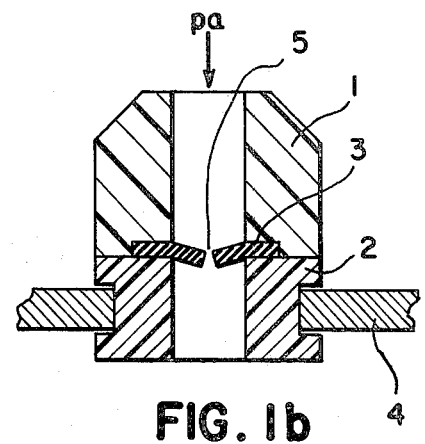
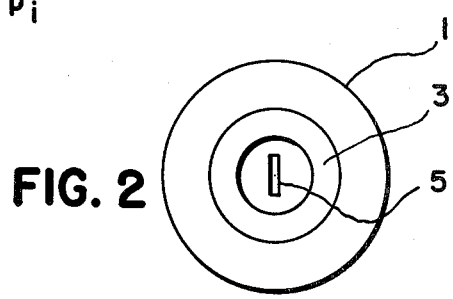
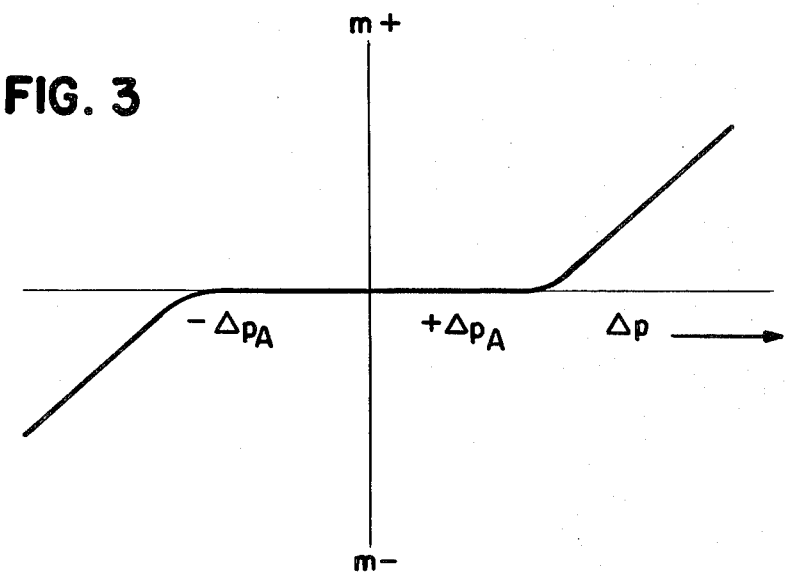

STORAGE BATTERY WITH AQUEOUS ELECTROLYTE AND RECOMBINER

The invention relates to a storage battery with aqueous electrolyte and a recombination catalyst for recombining the hydrogen and oxygen which evolved during charging or self discharge.

In storage battery cells having aqueous electrolyte, e.g. in a lead cell as well as in Ni/Cd cells, there evolve hydrogen and oxygen through electrolysis in the overcharge range. Self discharge is also capable of causing the evolution of hydrogen and oxygen during discharge or even during inoperative storage periods.

Because such electrolysis gases escape to the outside, the water volume diminishes; such storage batteries therefore require maintenance. By using a recombination catalyst, hydrogen and oxygen which evolve in the cell can be recombined into water, whereby the water regime is balanced. The electrolysis gases however are not evolved stoichiometrically because of the properties of the individual electrodes. Rather, they evolve with a predetermined phase displacement. In general the oxygen evolution begins before the hydrogen evolution. Heretofore this characteristic has been dealt with by permitting the oxygen to escape into the atmosphere through an aperture in the recombiner during periods of excess oxygen; during periods of excess availability of hydrogen this externally delivered $O_2$ is reintroduced into the cell through diffusion.

German patent publication (Offenlegungsschrift) No. 2,447,381 previously teaches housing the recombiner and the storage battery in a gas-tight vessel and utilizing the storage effect of the gas volume within the cell container above the electrolyte level for equilibration of the gas balance which is upset through non-stoichiometric gas evolution.

In accordance with a further proposal of this patent publication stoichiometric relationships are established with the aid of an inert auxiliary electrode having low hydrogen or oxygen excess potential by liberating hydrogen in case of hydrogen lack, by contacting the auxiliary electrode with the negative lead electrode. Correspondingly, for oxygen shortage, the auxiliary electrode is contacted by the positive $PbO_2$ electrode. With these means, however, the danger cannot be excluded that the gas balance becomes displaced over long periods of time through corrosion of the electrode metals and capacity displacement. Moreover, it is also possible that the recombiner fails after extended periods of use, whereupon the pressure within the system rises intolerably.

Accordingly, it is an object of the invention to make the gas tight functioning of the storage battery more reliable and to protect the gas regime from pronounced departures from equilibrium.

This and other objects which will appear are achieved in accordance with the invention by placing the storage battery and recombiner in a common, gas tight housing or in two gas tight housings which communicate with each other, and by providing two valves, one of which opens in response to the exceeding of a predetermined overpressure, while the second opens in response to falling below a predetermined underpressure.

Thus the apparatus embodying the invention has two valves working in opposite senses between the interior gas space and the ambient air. In principle these could be two bicycle valves so positioned in the housing lid that the one vents to the outside in response to high internal pressure, whereas the other admits atmospheric outside air into the interior in response to underpressure, as would be the case in response to an air pump activated from the outside.

In a preferred embodiment of the invention the two valve functions are united in a single valve.

For further details reference is made to the discussion which follows in light of the accompanying drawings wherein FIGS. 1a and 1b show such a dual function valve in its two open states;

FIG. 2 shows a top view of the valve; and

FIG. 3 shows the flow of gas as a function of pressure differential.

FIG. 1 shows a dual function valve. In FIG. 1a it is in the state in which it is open to the outside through an internal overpressure $P_i$ and in FIG. 1b it is open toward the inside through external overpressure $P_a$.

FIG. 2 as well as FIG. 1 show the valve body consisting of two flat, thick-walled tube segments 1 and 2 which may be of a plastic material, for instance, assembled with insertion of rubber membrane 3 and fitted into the housing lid 4. The membrane bridges the internal cross-section of the valve body and securely seals the storage battery housing under normal operating conditions. However, since it is provided through incision with a slit 5 it is capable of responding to overpressure by opening in the configuration of lips in both directions.

With such an arrangement the storage battery can be operated without the disadvantages noted above. Even if the recombiner should fail, the maintenance freedom of the storage battery is no longer effective but the protection against bursting of the housing is assured.

FIG. 3 shows in what manner the gas flow $m+$ toward the outside or $m-$ toward the inside takes place when an increasing pressure difference $\pm \Delta p$ with respect to the external atmospheric pressure exceeds a predetermined threshold $+\Delta P_A$ or $-\Delta P_A$. The gas flow ends as soon as the storage battery again exhibits equilibrium gas balance. The threshold or initial pressure $\Delta P_A$ should be in a region which exceeds 1 cm. but is less than 100 cm.water column. This corresponds to a pressure which deviates from atmospheric by between 1 and 100 millibars.

I claim:

1. A storage battery having an aqueous electrolyte and a recombination catalyst for recombining of hydrogen and oxygen evolving during charging or self-discharge, said storage battery comprising
    a communicating gas-tight housing for the storage battery and the recombiner, and
    two valves in said housing, one of said valves opening in response to a predetermined overpressure relative to the ambient outer atmosphere and the other of said valves opening in response to the falling below a predetermined underpressure.

2. The storage battery of claim 1 wherein the two valves are combined into a single dual-function valve having opposed transmission directions.

3. The storage battery of claim 1 wherein the communicating housings consists of a common housing for both the storage battery and the recombining means.

4. The storage battery of claim 1 wherein the communicating housing consists of two separate housings in gas communication with each other.

5. The storage battery of claim 1 wherein each valve means has an opening threshold at between 1 and 100 millibars.

6. The storage battery of claim 1 wherein the valve means is a slit type valve.

* * * * *